(12) United States Patent
Kobiro et al.

(10) Patent No.: US 10,058,847 B2
(45) Date of Patent: Aug. 28, 2018

(54) TITANIUM-OXIDE CATALYST AND METHOD OF PRODUCING THE SAME

(71) Applicants: Nippon Pillar Packing Co., Ltd., Osaka (JP); Kochi University of Technology, Kochi (JP)

(72) Inventors: Kazuya Kobiro, Kochi (JP); Masataka Otani, Kochi (JP); Keiichiro Moriwaki, Osaka (JP); Yukimi Hayashi, Osaka (JP)

(73) Assignees: Nippon Pillar Packing Co., Ltd., Osaka (JP); Kochi University of Technology, Kochi (JP)

( * ) Notice: Subject to any disclaimer, the term of this patent is extended or adjusted under 35 U.S.C. 154(b) by 0 days.

(21) Appl. No.: 15/072,673

(22) Filed: Mar. 17, 2016

(65) Prior Publication Data

US 2016/0271588 A1 Sep. 22, 2016

(30) Foreign Application Priority Data

Mar. 20, 2015 (JP) .................................. 2015-058058

(51) Int. Cl.
*B01J 21/06* (2006.01)
*B01J 23/38* (2006.01)
(Continued)

(52) U.S. Cl.
CPC ........... *B01J 23/462* (2013.01); *B01J 21/063* (2013.01); *B01J 23/40* (2013.01); *B01J 23/48* (2013.01);
(Continued)

(58) Field of Classification Search
CPC ... B01J 23/38; B01J 23/40; B01J 23/42; B01J 23/44; B01J 23/46; B01J 23/48;
(Continued)

(56) References Cited

U.S. PATENT DOCUMENTS 7,179,561 B2 * 2/2007 Niu ..................... H01M 8/1007
427/115
7,521,394 B2 * 4/2009 Xie ........................ B01J 21/063
423/610

(Continued)

FOREIGN PATENT DOCUMENTS

JP 2009-131835 A 6/2009
JP 2010-536556 A 12/2010
(Continued)

OTHER PUBLICATIONS

Japanese Office Action issued in Japanese Patent Application No. 2015-058058 dated Jun. 26, 2018, with English Translation (12 pages).

*Primary Examiner* — Cam N Nguyen
(74) *Attorney, Agent, or Firm* — Nakanishi IP Associates, LLC

(57) ABSTRACT

A titanium-oxide catalyst containing catalytic metal shows catalysis under high temperature conditions. A titanium-oxide catalyst contains a titanium-oxide nanoparticle assembly and ruthenium particles. The titanium-oxide nanoparticle assembly is an assembly of titanium-oxide nanoparticles, which are nanoparticles of titanium oxide. The ruthenium particles have a smaller particle diameter than the titanium-oxide nanoparticle assembly and the titanium-oxide nanoparticles. The ruthenium particles are dispersed and supported on a surface of the titanium-oxide nanoparticle assembly.

23 Claims, 5 Drawing Sheets

1 titanium oxide catalyst
10 titanium-oxide nanoparticle assembly
11 titanium oxide nanoparticle
20 ruthenium particle

(51) Int. Cl.
*B01J 23/40* (2006.01)
*B01J 23/42* (2006.01)
*B01J 23/44* (2006.01)
*B01J 23/46* (2006.01)
*B01J 23/48* (2006.01)
*B01J 23/50* (2006.01)
*B01J 23/52* (2006.01)
*B01J 23/70* (2006.01)
*B01J 23/72* (2006.01)
*B01J 23/74* (2006.01)
*B01J 23/745* (2006.01)
*B01J 23/755* (2006.01)
*B01J 23/89* (2006.01)
*B01J 35/00* (2006.01)
*B01J 35/02* (2006.01)
*B01J 37/00* (2006.01)
*B01J 37/03* (2006.01)
*B01J 37/18* (2006.01)
*B01D 53/86* (2006.01)
*B01J 35/10* (2006.01)
*B82Y 40/00* (2011.01)
*B82Y 30/00* (2011.01)

(52) U.S. Cl.
CPC ............... *B01J 23/70* (2013.01); *B01J 23/74* (2013.01); *B01J 35/002* (2013.01); *B01J 35/006* (2013.01); *B01J 35/008* (2013.01); *B01J 35/0013* (2013.01); *B01J 35/0046* (2013.01); *B01J 35/023* (2013.01); *B01J 35/1019* (2013.01); *B01J 37/009* (2013.01); *B01J 37/031* (2013.01); *B01J 37/033* (2013.01); *B01J 37/18* (2013.01); *B01D 53/8671* (2013.01); *B01D 2255/102* (2013.01); *B01D 2255/1026* (2013.01); *B01D 2255/20707* (2013.01); *B01D 2255/9202* (2013.01); *B01D 2257/504* (2013.01); *B82Y 30/00* (2013.01); *B82Y 40/00* (2013.01); *Y10S 977/811* (2013.01)

(58) Field of Classification Search
CPC ... B01J 23/50; B01J 23/52; B01J 23/70; B01J 23/72; B01J 23/74; B01J 23/745; B01J 23/755; B01J 23/89; B01J 35/0046; B01J 35/023; B01J 21/063; B01J 37/009; B01J 37/031; B01J 37/033; B01J 37/18; B01D 53/8671
See application file for complete search history.

(56) References Cited

U.S. PATENT DOCUMENTS

| | | | | |
|---|---|---|---|---|
| 7,727,931 B2* | 6/2010 | Brey | ............ | A62D 9/00 |
| | | | | 423/23 |
| 7,955,570 B2* | 6/2011 | Insley | ............ | B01D 53/864 |
| | | | | 422/177 |
| 7,989,384 B2* | 8/2011 | Brey | ............ | A62D 9/00 |
| | | | | 423/427 |
| 8,058,202 B2* | 11/2011 | Brady | ............ | B01D 53/864 |
| | | | | 423/427 |
| 8,288,311 B2* | 10/2012 | Dhingra | ............ | B01J 23/52 |
| | | | | 502/243 |
| 8,314,046 B2* | 11/2012 | Brady | ............ | B01D 53/864 |
| | | | | 423/427 |
| 8,314,048 B2* | 11/2012 | Brey | ............ | A62D 9/00 |
| | | | | 423/23 |
| 8,349,761 B2* | 1/2013 | Xia | ............ | B01J 21/063 |
| | | | | 502/240 |
| 8,450,236 B2* | 5/2013 | Fu | ............ | B01J 37/16 |
| | | | | 502/243 |
| 8,518,854 B2* | 8/2013 | Brady | ............ | B01D 53/864 |
| | | | | 423/23 |
| 8,618,020 B2* | 12/2013 | Brey | ............ | A62D 9/00 |
| | | | | 423/23 |
| 8,664,148 B2* | 3/2014 | Brey | ............ | A62D 9/00 |
| | | | | 502/184 |
| 8,664,149 B2* | 3/2014 | Brady | ............ | B01D 53/864 |
| | | | | 502/184 |
| 2006/0116282 A1* | 6/2006 | Honda | ............ | B01J 21/063 |
| | | | | 502/129 |

FOREIGN PATENT DOCUMENTS

| | | |
|---|---|---|
| JP | 2010-540651 A | 12/2010 |
| JP | 2013-236997 A | 11/2013 |
| WO | 2011-108250 A1 | 6/2013 |

* cited by examiner

| | |
|---|---|
| 1 | titanium oxide catalyst |
| 10 | titanium-oxide nanoparticle assembly |
| 11 | titanium oxide nanoparticle |
| 20 | ruthenium particle |

| | |
|---|---|
| 11 | titanium oxide nanoparticle |
| 20 | ruthenium particle |
| 101 | projection |
| 102 | depression |

TITANIUM-OXIDE CATALYST AND METHOD OF PRODUCING THE SAME

BACKGROUND OF INVENTION

Field of the Invention

The present invention relates to a catalyst containing catalytic metal supported on titanium oxide, and a method of producing the catalyst.

Background Art

In various fields ranging from catalytic chemistry to semiconductors, research has been conducted to use metals or metal oxides prepared in the form of nanoparticles. Nanoparticles refer to particles on the scale of nanometers. With their size characteristics, nanoparticles have functions and effects greatly differing from the same material in bulk form. For example, nanoparticles have higher activities due to their larger specific surface areas, and have quantum size effects.

To show such unique functions, nanoparticles need to have their size and shape under control. However, nanoparticles are physically and chemically unstable. For example, their size and shape can change when, for example, neighboring nanoparticles aggregate. Controlling such aggregation and other behaviors of nanoparticles has been difficult.

In catalytic chemistry, for example, catalysts with high activities are produced by preparing nanoparticles of metal as a catalyst, which are then dispersed and supported onto the surface of a catalyst carrier. When this catalyst is used under high temperature conditions intended for a catalytic reaction or under high temperature conditions caused by heat generated from a catalytic reaction, the heat from such intentional heating or the reaction heat from the catalytic reaction can move the catalytic metal dispersed and supported on the catalyst carrier. The catalytic metal may then undergo aggregation and sintering. As a result, the nanoparticles may change their size and shape, and may no longer have their properties unique to nanoparticles, or may have smaller specific surface areas. This will greatly lower the catalytic activity of the catalyst.

In response to this issue, Patent Literature 1 describes a catalyst for hydrogen reduction, which contains metal catalyst nanoparticles with a particle diameter smaller than 10 nm supported on catalyst carrier powder.

A catalyst for hydrogen reduction produced with the technique described in Patent Literature 1 can accelerate a hydrogenation reaction of carbon dioxide with high conversion under atmospheric pressure at a reaction temperature not exceeding 200° C.

However, reactions using catalysts for hydrogenation, such as catalytic reactions for converting carbon dioxide into methane or methanol and reductive reactions of exhaust gas, commonly involve high temperature conditions ranging from 300 to 600° C. If the catalyst for hydrogen reduction described in Patent Literature 1 is used under such high temperature conditions, catalytic metal supported on the catalyst for hydrogen reduction may be sintered to increase their particle size and may no longer be nanoparticles, or may have smaller surface areas. This will greatly lower the catalytic activity of the catalyst. The catalyst for hydrogen reduction described in Patent Literature 1 thus cannot be used under high temperature conditions.

CITATION LIST

Patent Literature

Patent Literature 1: Japanese Unexamined Patent Application Publication No. 2009-131835

SUMMARY OF INVENTION

One or more aspects of the present invention are directed to a titanium-oxide catalyst containing catalytic metal that shows catalysis under high temperature conditions.

One aspect of the present invention provides a titanium-oxide catalyst including a titanium-oxide nanoparticle assembly that is an assembly of titanium-oxide nanoparticles as primary particles, and catalytic metal dispersed and supported on a surface of the titanium-oxide nanoparticle assembly. The catalytic metal has a smaller particle diameter than the titanium-oxide nanoparticle assembly and the primary particles.

Another aspect of the present invention provides a method of producing a titanium-oxide catalyst. The method includes causing catalytic metal to be supported on a titanium-oxide nanoparticle assembly. The titanium-oxide nanoparticle assembly is an assembly of titanium-oxide nanoparticles as primary particles.

The nanoparticles refer to nanosized particles with a particle diameter of 1 to 100 nm inclusive. In other words, the primary particles are nanosized particles of titanium-oxide with a particle diameter of 1 to 100 nm inclusive.

The particle diameter may be the particle diameter of each nanoparticle, or may be an average value calculated from the particle diameters of a plurality of nanoparticles.

The titanium-oxide nanoparticle assembly may be spherical, tubular, plate-like such as a thin film, or cylindrical, or may have a hierarchical structure, or may also be an irregular assembly. In other words, the titanium-oxide nanoparticle assembly may not have a specific appearance, and may be, for example, a solid or hollow sphere, plate, or cylinder. The titanium-oxide nanoparticle assembly referred to herein may have any appearance.

The catalytic metal may be at least one metal selected from the group consisting of Fe, Ir, Au, Ag, Ru, Pt, Pd, Cu, Ni, Rh, and Re, or may be an alloy of any combination of these metals, or may be a compound with catalytic activity such as a complex containing at least one of these metals. The catalytic metal may be a metal with catalytic activity or a compound containing a metal.

The catalytic metal refers to nanosized metal particles that are smaller than the titanium-oxide nanoparticle assembly and are also smaller than the primary particles.

The catalytic metal may be supported on the titanium-oxide nanoparticle assembly by sputtering or by a wet method. This process may be performed with any method that allows the catalytic metal to be supported on the surface of the titanium-oxide nanoparticle assembly.

The titanium-oxide catalyst containing the catalytic metal can show desired catalysis under high temperature conditions, where the catalytic metal is otherwise likely to be sintered.

In detail, the titanium-oxide nanoparticles have large specific surface areas. The titanium-oxide nanoparticle assembly, which is an assembly of such titanium-oxide nanoparticles, has a specific surface area about 50 times larger than the specific surface area of a solid titanium-oxide particle with the same size. This titanium-oxide nanoparticle assembly allows many particles of the catalytic metal to be dispersed and supported on its surface.

The titanium-oxide nanoparticle assembly, which is an assembly of nanoparticles as the primary particles, has surface irregularities (projections and depressions) across the entire surface. Thus, when, for example, the catalytic metal supported on the assembly surface is moved by heat generated from a catalytic reaction or by heat from intentional heating, the catalytic metal is supported in the depressions on the entire surface of the titanium-oxide nanoparticle assembly. The movement of the catalytic metal supported in each depression is suppressed by protrusions adjacent to each depression. As a result, the catalytic metal is supported in each depression in a stable manner. The metal catalyst can thus be dispersed with a constant degree of dispersion on the surface of the titanium-oxide nanoparticle assembly under high temperature conditions.

The titanium-oxide nanoparticle assembly, which is an assembly of primary particles, has surface irregularities (projections and depressions), and thus has a larger surface area than a solid titanium-oxide particle with the same size, and can allow many particles of the catalytic metal to be supported on its surface.

As a result, the titanium-oxide catalyst containing the catalytic metal can show desired catalysis under high temperature conditions, where the catalytic metal is otherwise likely to be sintered.

In the titanium-oxide catalyst according to the aspect of the invention, the catalytic metal may be supported in depressions formed by adjacent primary particles of the titanium-oxide nanoparticle assembly.

The method according to the aspect of the invention may further include thermally treating the titanium-oxide nanoparticle assembly on which the catalytic metal has been supported.

In this aspect of the invention, the catalytic metal is supported on the titanium-oxide nanoparticle assembly and is then treated thermally. This allows the catalytic metal to be dispersed and supported in many depressions formed on the surface of the titanium-oxide nanoparticle assembly. As a result, the catalytic metal can have desired catalysis in a stable manner.

In detail, the titanium-oxide catalyst can also have a sufficiently large number of catalytic metal particles dispersed and arranged on projections formed on the surface of the titanium-oxide nanoparticle assembly under high temperature conditions. When, for example, this titanium-oxide catalyst is used to catalyze a hydrogenation reaction of carbon dioxide under high temperature conditions, the catalyst, initially showing high catalysis, may allow its catalytic metal particles supported on the projections to move into depressions and be supported in the depressions over time. In this case, catalytic metal nanoparticles in some depressions may aggregate. This will lower the catalytic activity of the titanium-oxide catalyst. The catalytic activity of this titaniumvoxide catalyst is unstable.

In contrast, the titanium-oxide catalyst, in which the catalytic metal has been supported on the titanium-oxide nanoparticle assembly, is left for a predetermined period of time under high temperature conditions. In this case, the catalytic metal particles supported on the projections may move into neighboring depressions and may be supported in these depressions. The titanium-oxide catalyst can thus have its catalytic metal particles supported in depressions formed by adjacent primary particles.

The movement of the catalytic metal particles supported in the depressions is suppressed by neighboring projections surrounding these depressions. The catalytic metal particles are thus dispersed and supported in the depressions in a stable manner. Although such catalytic metal particles may receive intense heat generated in a catalytic reaction, these catalytic metal particles cannot cross over neighboring projections. This prevents sintering of the catalytic metal particles supported in adjacent depressions.

As a result, the titanium-oxide catalyst contains catalytic metal particles dispersed and arranged in depressions formed on the surface of the titanium-oxide nanoparticle assembly, and prevents such catalytic metal particles from being moved and sintered under high temperature conditions. The titanium-oxide catalyst can thus have desired catalysis in a stable manner.

In the titanium-oxide catalyst according to the aspect of the invention, the content of the catalytic metal may be 1 to 40 wt % inclusive of the total of 100 wt % of the titanium-oxide nanoparticle assembly and the catalytic metal.

In some embodiments, the content of catalytic metal may be 5 to 10 wt % inclusive of the total of 100 wt % of the titanium-oxide nanoparticle assembly and the catalytic metal.

In this aspect of the invention, the titanium-oxide catalyst can function more efficiently.

In detail, when the content of the catalytic metal is less than 1 wt % of the total of 100 wt % of the titanium-oxide nanoparticle assembly and the catalytic metal, for example, the titanium-oxide catalyst can have an insufficient amount of catalytic metal supported on the surface of the titanium-oxide nanoparticle assembly. The resultant titanium-oxide catalyst may not show sufficiently effective catalysis.

When the content of the catalytic metal is greater than 40 wt %, too many particles of the catalytic metal will be supported on the surface of the titanium-oxide nanoparticle assembly. In this case, adjacent catalytic metal particles may aggregate under reaction heat from a catalytic reaction, and may be sintered. This will lower the efficiency of the catalysis.

The content of the catalytic metal may be in a range of 1 to 40 wt % inclusive of the total of 100 wt % of the titanium-oxide nanoparticle assembly and the catalytic metal. In this case, the titanium-oxide catalyst can maintain its intended functions as a catalyst, and can also show efficient catalysis.

With the content of the catalytic metal in a range of 5 to 10 wt % inclusive, the titanium-oxide catalyst can contain a sufficiently large amount of catalytic metal. In this case, the catalytic metal is less likely to undergo aggregation and sintering. The titanium-oxide catalyst can have more efficient catalysis.

In the titanium-oxide catalyst according to the aspect of the invention, the primary particles may have a particle diameter of 2 to 50 nm inclusive.

In this aspect of the invention, the titanium-oxide nanoparticle assembly can have desired projections and depressions on its surface.

In detail, when the primary particles have a particle diameter smaller than 2 nm, the distance from the bottom of a depression to the top of a projection formed by adjacent primary particles can be shorter than the height of the catalytic metal particles in the titanium-oxide nanoparticle assembly, which is an assembly of primary particles. In this case, the movement of catalytic metal particles supported in such depressions cannot be suppressed. The catalytic metal particles supported in the depressions may move by crossing over the projections when receiving reaction heat generated in a catalyst reaction or receiving heat intended for a catalytic reaction, and may aggregate with other catalytic metal particles. As a result, the catalytic metal particles may be sintered. The sintered catalytic metal will increase its particle size, and can lose its intended functions as nanoparticles, and further can have smaller surface areas. This will lower the catalytic activity of the titanium-oxide catalyst.

When the primary particles have a particle diameter of 50 nm or more, the titanium-oxide nanoparticle assembly will have fewer projections and depressions per predetermined surface area than when the primary particles have a smaller particle diameter. In this case, the titanium-oxide nanoparticle assembly will have deeper depressions, but can have many catalytic metal particles supported on its projections. When a catalytic reaction occurs, catalytic metal particles supported on the projections can undergo aggregation, or many catalytic metal particles may aggregate in a small number of depressions. These catalytic metal particles can be sintered. This will lower the catalytic activity of the titanium-oxide catalyst.

When the primary particles have a particle diameter of 2 to 50 nm inclusive, the titanium-oxide nanoparticle assembly will have a sufficiently large number of projections, and a sufficiently large number of depressions with a desired depth for regulating the movement of catalytic metal particles supported in the depressions. This prevents catalytic metal particles supported on the surface of the titanium-oxide nanoparticle assembly from undergoing excessive aggregation and sintering. As a result, the titanium-oxide catalyst will show more efficient catalysis.

When the primary particles have a particle diameter of 20 nm or more, the titanium-oxide nanoparticle assembly will have an appropriate number of sufficiently high projections on its surface. In this case, the movement of catalytic metal particles can be suppressed more effectively under thermal vibrations that may occur when receiving heat. The catalytic metal particles cannot cross over such projections, and will be supported in the depressions in a reliable manner.

When the primary particles have a particle diameter of 40 nm or less, the titanium-oxide nanoparticle assembly will have many depressions that are deep enough to regulate the movement of catalytic metal particles on the surface of the titanium-oxide nanoparticle assembly. This allows a sufficiently large number of catalytic metal particles to be supported in the depressions.

The primary particles may thus have a particle diameter of 20 to 40 nm inclusive in some embodiments.

In the titanium-oxide catalyst according to the aspect of the invention, the catalytic metal may have a particle diameter of 1 to 10 nm inclusive, and the primary particles may have a particle diameter at least twice the particle diameter of the catalytic metal.

In this aspect of the invention, the catalytic metal particles supported on the surface of the titanium-oxide nanoparticle assembly are prevented from undergoing aggregation and sintering when the surface of the titanium-oxide catalyst is under high temperature conditions.

In detail, each projection formed by adjacent primary particles in the titanium-oxide nanoparticle assembly is sufficiently high, relative to the size of each catalytic metal particle. Such projections can regulate the movement of catalytic metal particles supported in depressions formed by adjacent primary particles when, for example, the catalytic metal particles receive reaction heat generated from a catalytic reaction.

Thus, the catalytic metal particles are prevented from undergoing aggregation and sintering. The titanium-oxide catalyst will have efficient catalysis.

In the titanium-oxide catalyst according to the aspect of the invention, the titanium-oxide nanoparticle assembly may have a particle diameter of 100 to 2000 nm inclusive.

In some embodiments, the titanium-oxide nanoparticle assembly may have a particle diameter of 400 to 800 nm inclusive.

In this aspect of the invention, the titanium-oxide catalyst can be produced to have sufficient catalysis.

In detail, when the titanium-oxide nanoparticle assembly has a particle diameter of 100 nm or less, the titanium-oxide catalyst can fill a space having a predetermined size with a high filling factor, or in other words, the titanium-oxide catalyst can fill the space with high density. In this case, many particles of titanium-oxide catalyst can have unexposed surfaces. As a result, catalytic metal particles supported on the surface of the titanium-oxide nanoparticle assembly may be covered, and thus cannot have sufficiently high catalytic activity. More specifically, when the titanium-oxide nanoparticle assembly has a particle diameter of 100 nm or more, the titanium-oxide catalyst will contain the catalytic metal particles supported on the titanium-oxide nanoparticle assembly with their surfaces exposed to outside air without being covered inside. As a result, the titanium-oxide catalyst can show sufficient catalysis.

Further, no great improvement is observed in the catalysis of the titanium-oxide catalyst produced using the titanium-oxide nanoparticle assembly with a particle diameter larger than 2000 nm, when the conversion of this titanium-oxide catalyst is compared with the conversion of the titanium-oxide catalyst produced using the titanium-oxide nanoparticle assembly with a particle diameter of 2000 nm or less. In addition, preparing the titanium-oxide nanoparticle assembly with a particle diameter larger than 2000 nm takes a long time.

Despite its long time to prepare the titanium-oxide nanoparticle assembly with a particle diameter larger than 2000 nm, the resultant titanium-oxide catalyst does not have improved catalysis. The use of the titanium-oxide nanoparticle assembly with a particle diameter of 2000 nm or less will save time and cost.

The titanium-oxide catalyst containing the titanium-oxide nanoparticle assembly with a particle diameter of 100 to 2000 nm inclusive will have sufficient catalysis, and will save time and cost for its production.

In the titanium-oxide catalyst according to the aspect of the invention, the catalytic metal may be at least one metal selected from the group consisting of Ru, Pt, Pd, Au, Ag, Cu, Ni, Fe, Ir, Rh, and Re.

In this aspect of the invention, the titanium-oxide catalyst containing the catalytic metal can generate methane and water by using carbon dioxide and hydrogen.

One or more embodiments of the present invention provide a titanium-oxide catalyst containing catalytic metal that shows desired catalysis under high temperature conditions.

DETAILED DESCRIPTION

Figure 1A:
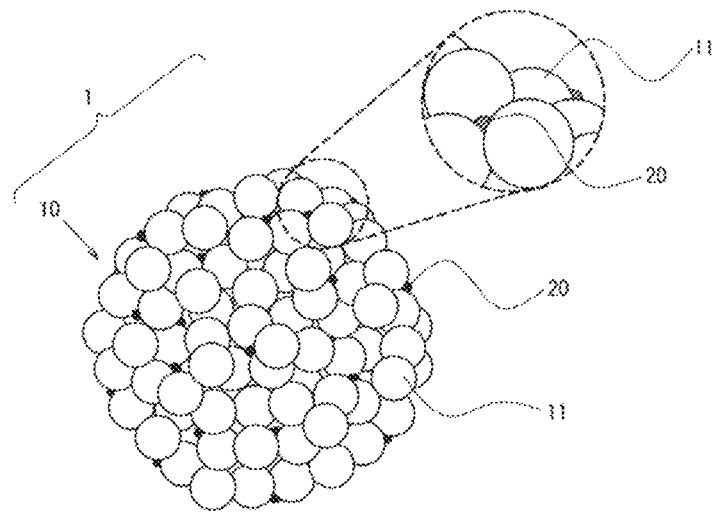
FIGS. 1A and 1B are diagrams describing a titanium-oxide catalyst.
Figure 1B:
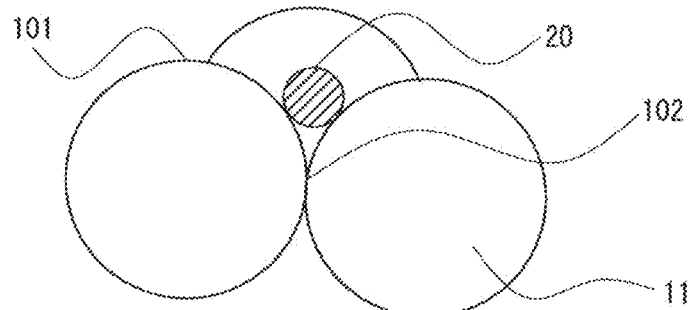
Figure 2:
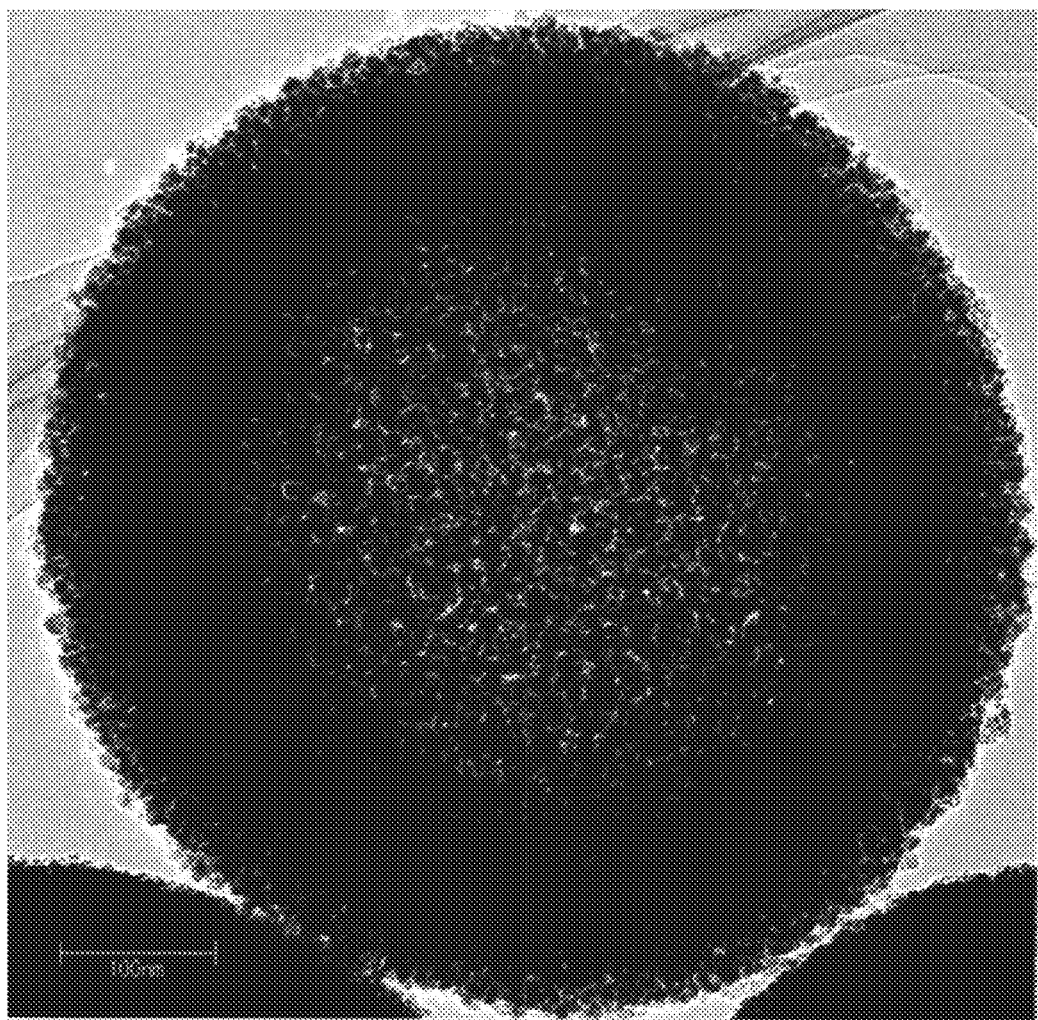
FIG. 2 is a TEM image of a titanium-oxide catalyst.
Figure 4A:
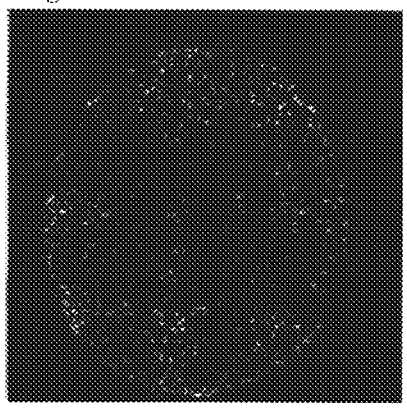
FIGS. 4A to 4C are photographs showing EDX mapping of titanium-oxide catalysts produced in example 1.
Figure 4B:
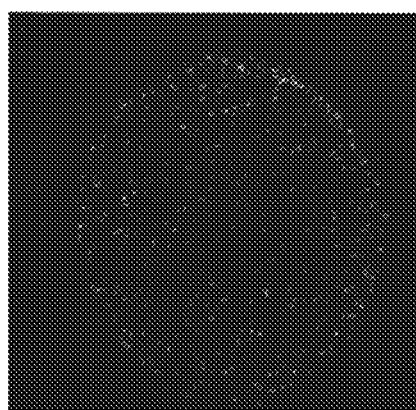
Figure 4C:
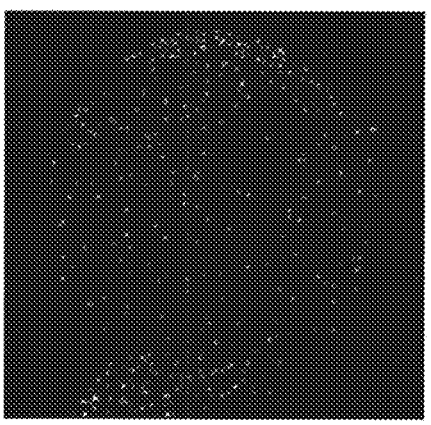
Figure 5:
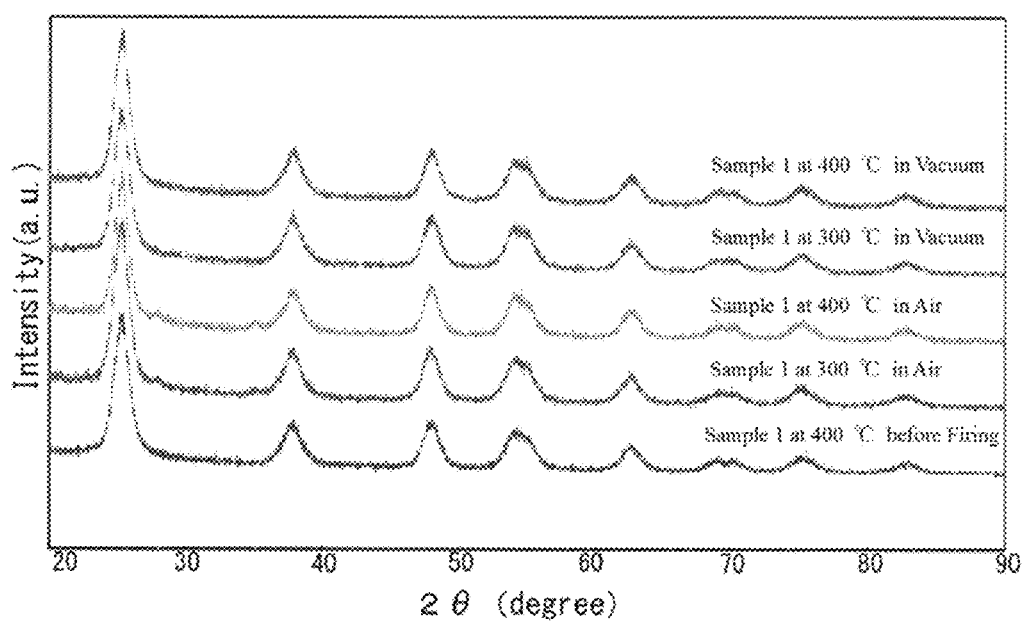
FIG. 5 is a graph showing X-ray diffraction data for titanium-oxide catalysts.

FIGS. 1A and 1B are diagrams describing the structure of a titanium-oxide catalyst 1. FIG. 2 is a TEM image of sample 1 produced in example 1. FIGS. 3A to 3F are TEM images of sample 1 produced in example 1 and sample 1 produced in comparative example 1. FIGS. 4A to 4C are images showing EDX mapping of sample 1 produced in example 1. FIG. 5 is a graph showing X-ray diffraction data for sample 1 produced in example 1.

In detail, FIG. 2 is a low-resolution TEM image of sample 1 produced in example 1. In this enlarged image, the bar, which is 0.12 times as long as the width of the image, represents 100 nm.

Figure 3A:
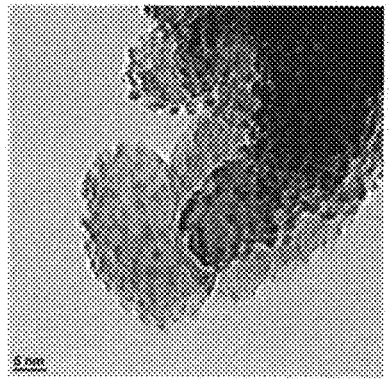
FIGS. 3A to 3F are TEM images of titanium-oxide catalysts.
Figure 3B:
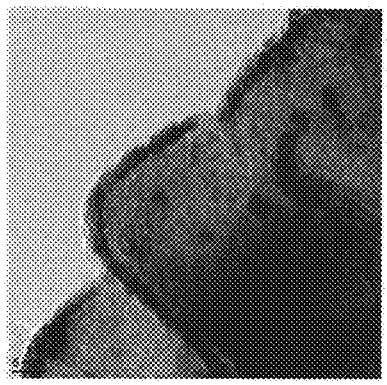
Figure 3C:
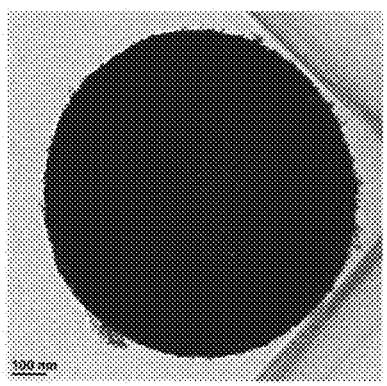
Figure 3D:
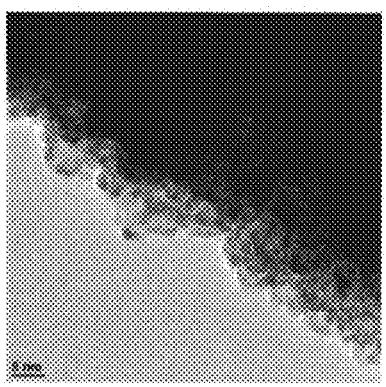
Figure 3E:
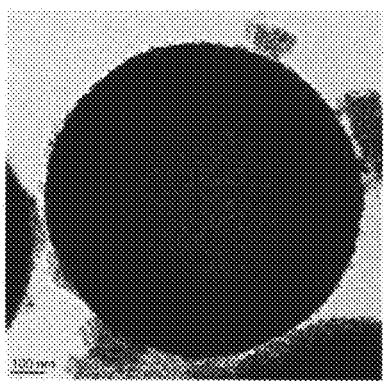
Figure 3F:
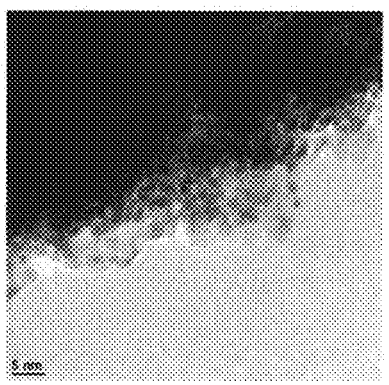

FIG. 3A is a high-resolution TEM image of comparative sample 1 produced in comparative example 1 before calcination, whereas FIG. 3B is a high-resolution TEM image of comparative sample 1 produced in comparative example 1 after calcination. FIG. 3C is a low-resolution TEM image of sample 1 produced in example 1 before calcination, whereas FIG. 3D is a high-resolution TEM image of sample 1 produced in example 1 before calcination. FIG. 3E is a low-resolution TEM image of sample 1 produced in example 1 after calcination, whereas FIG. 3F is a high-resolution TEM image of sample 1 produced in example 1 after calcination. The scale bar in the lower left corner of each image represents the scale of the image.

FIG. 4A is a image showing energy dispersive X-ray (EDX) mapping indicating the distribution of Ru in sample 1 produced in example 1 before calcination. FIG. 4B is a photograph showing EDX mapping indicating the distribution of Ru in sample 1 produced in example 1 after calcination at 300° C. performed in a vacuum. FIG. 4C is a photograph showing EDX mapping indicating the distribution of Ru in sample 1 produced in example 1 after calcination at 400° C. performed in a vacuum.

FIG. 5 is a graph showing X-ray diffraction data for sample 1 before calcination, and sample 1 after calcination at 300° C. or at 400° C. in a vacuum or in the air.

The structure of the titanium-oxide catalyst 1 will now be described briefly with reference to FIGS. 1A and 1B.

As shown in FIGS. 1A and 1B, the titanium-oxide catalyst 1 contains a titanium-oxide nanoparticle assembly 10 and ruthenium particles 20. The titanium-oxide nanoparticle assembly 10 is an assembly of nanosized titanium-oxide nanoparticles 11. The ruthenium particles 20, as nanosized catalytic metal, are supported on the surface of the titanium-oxide nanoparticle assembly 10.

The titanium-oxide nanoparticle assembly 10 is an assembly of titanium-oxide nanoparticles 11, which are spherical particles with a diameter of 100 to 2000 nm. The titanium-oxide nanoparticle assembly 10 thus has surface irregularities, or projections 101 and depressions 102 on its surface (refer to FIG. 1B).

The titanium-oxide nanoparticles 11 are spherical nanoparticles having a particle diameter of 2 to 50 nm.

As shown in FIG. 1A, the ruthenium particles 20 are nanosized particles of ruthenium elements functioning as a catalyst with a particle diameter of 2 to 10 nm. The ruthenium particles 20 are supported in the depressions 102 on the surface of the titanium-oxide nanoparticle assembly 10 (refer to FIG. 1B). Also, as shown in FIGS. 1A and 1B, an average distance between ruthenium particles 20 (as cata-lytic metal particles) is larger than an average distance between the titanium-oxide nanoparticles (as primary particles).

A method of producing a titanium-oxide catalyst and a titanium-oxide catalyst synthesized by this production method will now be described.

The method of producing a titanium-oxide catalyst according to one or more embodiments of the present invention is not limited to the method described below, and may be another method. The titanium-oxide catalyst according to one or more embodiments of the present invention is not limited to the titanium-oxide catalyst produced by the production method described below, and may be a titanium-oxide catalyst produced by another production method.

The method of producing a titanium-oxide catalyst in the present embodiment includes a reaction process in which a titanium compound reacts with carboxylic acid in a supercritical fluid, and a catalytic metal supporting process in which catalytic metal is supported on a titanium-oxide nanoparticle assembly prepared in the reaction process.

The supercritical fluid refers to a fluid with pressure and temperature exceeding a critical temperature and a critical pressure unique to the substance. The supercritical fluid has physical properties falling between a gas and a liquid.

In the present embodiment, supercritical methanol is used as the supercritical fluid. Supercritical methanol can be used to synthesize spherical, porous inorganic oxide nanoparticles (titanium-oxide nanoparticle assembly 10) without causing separation between primary particles, which are titanium-oxide nanoparticles.

The concentration of the titanium compound to methanol is 0.01 to 1.0 mol/L.

Although ortho-phthalic acid is used as the carboxylic acid to react with the titanium compound as an inorganic compound in one or more embodiments of the present invention, formic acid may be used as the carboxylic acid, instead of ortho-phthalic acid.

The carboxylic acid reacts with the titanium compound in supercritical methanol to produce the spherical porous titanium-oxide nanoparticle assembly 10 without separation of the primary particles.

In some embodiments, the concentration of the carboxylic acid to methanol may be 0.05 to 5.0 mol/L.

A method for causing the ruthenium particles 20, which are metal nanoparticles, to be supported on the titanium-oxide nanoparticle assembly 10 in the catalytic metal supporting process will now be described. In embodiments of the present invention, the catalytic metal is supported by a wet synthesis method.

With the wet synthesis method, a reducing agent, which may be an organic reducing agent such as alcohol, triethanolamine, ascorbic acid, citric acid, or oxalic acid, or an inorganic reducing agent such as sodium borohydride, is added to a solution containing a catalyst carrier and catalytic metal mixed together to cause a reductive reaction.

More specifically, the titanium-oxide nanoparticle assembly, which is a catalyst carrier, is mixed with an inorganic salt of metal, which is a catalyst, in water or alcohol to obtain a precursor solution. The precursor solution is then reacted with the above reducing agent under heating at room temperature or at about 60° C. to synthesize the titanium-oxide catalyst on which the metal catalyst is supported. The reaction time is about a few hours to one day. After the reaction, the solution undergoes centrifugation to separate the titanium-oxide catalyst from the precursor solution containing the reducing agent, and the precipitated titanium-oxide catalyst is collected. The collected titanium-oxide catalyst is washed several times with water or alcohol, and is then dried under heating at room temperature or at about 40 to 60° C. under reduced pressure to obtain titanium-oxide catalyst powder, which is the target compound.

Although Ru is used as catalytic metal in one or more embodiments of the present invention, any other metal having catalytic activity, such as Pt, may be used. Examples of such metals include Ni, Pd, Au, Ag. Fe, Ir. Cu, Rh, and Re. A complex or a compound containing one of these metals may also be used. In other words, the catalytic metal may be any nanosized metal or metal compound with catalysis lower than the titanium-oxide nanoparticle assembly and the primary particles.

Although the catalytic metal is supported by the wet synthesis method as described above, the nanosized catalytic metal may be supported on the titanium-oxide nanoparticle assembly by another method, for example, by sputtering. In other words, the catalytic metal may be supported by any method that allows the catalytic metal with a desired size to be supported on the surface of the titanium-oxide nanoparticle assembly.

The method of producing the titanium-oxide catalyst and the titanium-oxide catalyst produced with that method will now be described by way of example.

EXAMPLE 1

First, 830 mg of ortho-phthalic acid ($C_6H_4(COOH)_2$) (Wako Pure Chemical Industries, Ltd.), which is an organic modifier, was added to 10 mL of methanol (Wako Pure Chemical Industries, Ltd.) at a concentration of 0.5 mol/L, and 207 mg of titanium tetraisopropoxide ($Ti[OCH(CH_3)_2]_4$) (Tokyo Chemical Industry Co., Ltd.) was mixed into the solution while it was being stirred.

Subsequently, the solution was heated to 300° C. and pressurized to 17 MPa to obtain supercritical methanol. The solution was then reacted for 10 minutes and then centrifuged at 6600 rpm for 10 minutes. The resultant precipitate was separated by decantation. Fresh methanol was added to the precipitate. The solution then underwent this procedure of centrifugation and decantation repeated twice. The resultant precipitate was then dried at 0.001 KPa (0.01 hPa) for 12 hours to obtain titanium-oxide nanoparticle assembly powder.

Subsequently, 100 mg of the titanium-oxide nanoparticle assembly and 3.0 mg of $RuCl_3.3H_2O$ powder (Wako Pure Chemical Industries, Ltd.), which is an inorganic salt of Ru as catalytic metal according to one or more embodiments of the present invention, were mixed into 100 mL of water to obtain a precursor solution. An excess amount of triethanolamine as a reducing agent, which amounts to three or more equivalents, was then added to the precursor solution, which was then reacted at room temperature for three hours. After the reaction, the solution was centrifuged at 6600 rpm for 10 minutes with a centrifuge to allow precipitation of the titanium-oxide nanoparticle assembly on which the catalytic metal was supported. The titanium-oxide nanoparticle assembly with the supported catalytic metal precipitate was then separated by decantation. The separated titanium-oxide nanoparticle assembly with the supported catalytic metal was then washed several times with water or alcohol, and then dried at 40° C. under reduced pressure.

This procedure yields a sample in example 1 (sample 1). The amount of Ru supported in the obtained sample was measured by inductively coupled plasma atomic emission spectroscopy (ICP-AES). The measurements show that Ru supported in sample 1 prepared in this example amounts to 3.02 wt %.

FIG. 2 is a TEM image of sample 1 prepared as described above captured with a transmission electron microscope (JEM-2100F by JEOL Ltd.).

Through measurements using the TEM image in FIG. 2, the particle diameter of the titanium-oxide nanoparticle assembly of sample 1 and other information can be obtained. More specifically, the size of a target particle is measured using TEM images captured with five predetermined fields of view, and the average value is calculated. The results show that the particle diameter of sample 1 is about 610 nm, the particle diameter of titanium-oxide nanoparticles as the primary particles of sample 1 is about 19 nm, and the particle diameter of Ru nanoparticles of sample 1 is 3.2 nm.

EXAMPLE 2

A sample in example 2 (sample 2) was produced basically in the same manner as in example 1, except that 92 mg of titanium tetraisopropoxide ($Ti[OCH(CH_3)_2]_4$) (Wako Pure Chemical Industries, Ltd.) was mixed into 10 mL of methanol (Wako Pure Chemical Industries, Ltd.) while the solution was being stirred.

The measurements conducted using TEM images in the same manner as for sample 1 show that the particle diameter of the titanium-oxide catalyst of sample 2 is about 580 nm, the particle diameter of titanium-oxide nanoparticles as the primary particles of sample 2 is about 8 nm, and the particle diameter of Ru nanoparticles of sample 2 is 2.9 nm. The measurements also show that Ru supported in sample 2 prepared in this example amounts to 3.18 wt %.

EXAMPLE 3

A sample in example 3 (sample 3) was produced basically in the same manner as in example 1, except that 121 mg of titanium tetraisopropoxide ($Ti[OCH(CH)_2]_4$) (Wako Pure Chemical Industries, Ltd.) was mixed into 10 mL of methanol (Wako Pure Chemical Industries, Ltd.) while the solution was being stirred.

The measurements conducted using TEM images in the same manner as for sample 1 show that the particle diameter of the titanium-oxide catalyst of sample 3 is about 600 nm, the particle diameter of titanium-oxide nanoparticles as the primary particles of sample 3 is about 12 nm, and the particle diameter of Ru nanoparticles of sample 3 is 3.0 nm. The measurements also show that Ru supported in sample 3 prepared in this example amounts to 3.21 wt %.

EXAMPLE 4

A sample in example 4 (sample 4) was produced basically in the same manner as in example 1, except that 284 mg of titanium tetraisopropoxide ($Ti[OCH(CH_3)_2]_4$) (Wako Pure Chemical Industries, Ltd.) was mixed into 10 mL of methanol (Wako Pure Chemical Industries, Ltd.) while the solution was being stirred.

The measurements conducted using TEM images in the same manner as for sample 1 show that the particle diameter of the titanium-oxide catalyst of sample 4 is about 610 nm, the particle diameter of titanium-oxide nanoparticles as the primary particles of sample 4 is about 28 nm, and the particle diameter of Ru nanoparticles of sample 4 is 2.8 nm. The measurements also show that Ru supported in sample 4 prepared in this example amounts to 3.07 wt %.

EXAMPLE 5

A sample in example 5 (sample 5) was produced basically in the same manner as in example 1, except that 420 mg of titanium tetraisopropoxide ($Ti[OCH(CH_3)_2]_4$) (Wako Pure Chemical Industries, Ltd.) was mixed into 10 mL of methanol (Wako Pure Chemical Industries, Ltd.) while the solution was being stirred.

The measurements conducted using TEM images in the same manner as for sample 1 show that the particle diameter of the titanium-oxide catalyst of sample 5 is about 620 nm, the particle diameter of titanium-oxide nanoparticles as the primary particles of sample 5 is about 43 nm, and the particle diameter of Ru nanoparticles of sample 5 is 3.1 nm. The measurements also show that Ru supported in sample 5 prepared in this example amounts to 2.95 wt %.

EXAMPLE 6

A sample in example 6 (sample 6) was produced basically in the same manner as in example 1, except that 515 mg of titanium tetraisopropoxide ($Ti[OCH(CH_3)_2]_4$) (Wako Pure Chemical Industries, Ltd.) was mixed into 10 mL of methanol (Wako Pure Chemical Industries, Ltd.) while the solution was being stirred.

The measurements conducted using TEM images in the same manner as for sample 1 show that the particle diameter of the titanium-oxide catalyst of sample 6 is about 640 nm, the particle diameter of titanium-oxide nanoparticles as the primary particles of sample 6 is about 54 nm, and the particle diameter of Ru nanoparticles of sample 6 is 3.3 nm. The measurements also show that Ru supported in sample 6 prepared in this example amounts to 3.31 wt %.

EXAMPLE 7

A sample in example 7 (sample 7) was produced basically in the same manner as in example 1, except that 725 mg of titanium tetraisopropoxide ($Ti[OCH(CH_3)_2]_4$) (Wako Pure Chemical Industries, Ltd.) was mixed into 10 mL of methanol (Wako Pure Chemical Industries, Ltd.) while the solution was being stirred.

The measurements conducted using TEM images in the same manner as for sample 1 show that the particle diameter of the titanium-oxide catalyst of sample 7 is about 630 nm, the particle diameter of titanium-oxide nanoparticles as the primary particles of sample 7 is about 71 nm, and the particle diameter of Ru nanoparticles of sample 7 is 2.8 nm. The measurements also show that Ru supported in sample 7 prepared in this example amounts to 2.87 wt %.

EXAMPLE 8

A sample in example 8 (sample 8) was produced basically in the same manner as in example 1, except that 100 mg of the titanium-oxide nanoparticle assembly used in example 1 and 1.2 mg of powder of $RuCl_3.3H_2O$, which is an inorganic salt of Ru as catalytic metal according to one or more embodiments of the present invention, were mixed into 100 mL of water to prepare a precursor solution.

The measurements conducted using TEM images in the same manner as for sample 1 show that the particle diameter of the titanium-oxide catalyst of sample 8 is about 590 nm, the particle diameter of titanium-oxide nanoparticles as the primary particles of sample 8 is about 22 nm, and the particle diameter of Ru nanoparticles of sample 8 is 1.3 nm. The measurements also show that Ru supported in sample 8 prepared in this example amounts to 2.67 wt %.

EXAMPLE 9

A sample in example 9 (sample 9) was produced basically in the same manner as in example 1, except that 100 mg of the titanium-oxide nanoparticle assembly used in example 1 and 3.9 mg of powder of $RuCl_3.3H_2O$, which is an inorganic salt of Ru as catalytic metal according to one or more embodiments of the present invention, were mixed into 100 mL of water to prepare a precursor solution.

The measurements conducted using TEM images in the same manner as for sample 1 show that the particle diameter of the titanium-oxide catalyst of sample 9 is about 620 nm, the particle diameter of titanium-oxide nanoparticles as the primary particles of sample 9 is about 24 nm, and the particle diameter of Ru nanoparticles of sample 9 is 4.0 nm. The measurements also show that Ru supported in sample 9 prepared in this example amounts to 2.53 wt %.

EXAMPLE 10

A sample in example 10 (sample 10) was produced basically in the same manner as in example 1, except that 100 mg of the titanium-oxide nanoparticle assembly used in example 1 and 5.2 mg of powder of $RuCl_3.3H_2O$, which is an inorganic salt of Ru as catalytic metal according to one or more embodiments of the present invention, were mixed into 100 mL of water to prepare a precursor solution.

The measurements conducted using TEM images in the same manner as for sample 1 show that the particle diameter of the titanium-oxide catalyst of sample 10 is about 580 nm, the particle diameter of titanium-oxide nanoparticles as the primary particles of sample 10 is about 28 nm, and the particle diameter of Ru nanoparticles of sample 10 is 5.3 nm. The measurements also show that Ru supported in sample 10 prepared in this example amounts to 2.65 wt %.

EXAMPLE 11

A sample in example 11 (sample 11) was produced basically in the same manner as in example 1, except that 100 mg of the titanium-oxide nanoparticle assembly used in example 1 and 9.8 mg of powder of $RuCl_3.3H_2O$, which is an inorganic salt of Ru as catalytic metal according to one or more embodiments of the present invention, were mixed into 100 mL of water to prepare a precursor solution.

The measurements conducted using TEM images in the same manner as for sample 1 show that the particle diameter of the titanium-oxide catalyst of sample 11 is about 580 nm, the particle diameter of titanium-oxide nanoparticles as the primary particles of sample 11 is about 24 nm, and the particle diameter of Ru nanoparticles of sample 11 is 9.6 nm. The measurements also show that Ru supported in sample 11 prepared in this example amounts to 2.83 wt %.

EXAMPLE 12

A sample in example 12 (sample 12) was produced basically in the same manner as in example 1, except that supercritical methanol prepared in the manner described below was reacted for three minutes. The supercritical methanol was prepared by adding 284 mg of titanium tetraisopropoxide ($Ti[OCH(CH_3)_2]_4$) into 10 mL of methanol containing 830 mg of ortho-phthalic acid ($C_6H_4(COOH)_2$) as an organic modifier at a concentration of 0.5 mol/L while the solution was being stirred, and heating and pressurizing the solution (hereafter, mixture solution) to 300° C. and to 17 MPa as in example 1.

The measurements conducted using TEM images in the same manner as for sample 1 show that the particle diameter of the titanium-oxide catalyst of sample 12 is about 110 nm, the particle diameter of titanium-oxide nanoparticles as the primary particles of sample 12 is about 23 nm, and the particle diameter of Ru nanoparticles of sample 12 is 2.5 nm. The measurements also show that Ru supported in sample 12 prepared in this example amounts to 3.12 wt %.

EXAMPLE 13

A sample in example 13 (sample 13) was produced basically in the same manner as in example 1, except that supercritical methanol prepared in the manner described below was reacted for four minutes. The supercritical methanol was prepared by heating and pressurizing a mixture solution to 300° C. and to 17 MPa as in example 1.

The measurements conducted using TEM images in the same manner as for sample 1 show that the particle diameter of the titanium-oxide catalyst of sample 13 is about 200 nm, the particle diameter of titanium-oxide nanoparticles as the primary particles of sample 13 is about 25 nm, and the particle diameter of Ru nanoparticles of sample 13 is 3.4 nm. The measurements also show that Ru supported in sample 13 prepared in this example amounts to 2.98 wt %.

EXAMPLE 14

A sample in example 14 (sample 14) was produced basically in the same manner as in example 1, except that supercritical methanol prepared in the manner described below was reacted for seven minutes. The supercritical methanol was prepared by heating and pressurizing a mixture solution to 300° C. and to 17 MPa as in example 1.

The measurements conducted using TEM images in the same manner as for sample 1 show that the particle diameter of the titanium-oxide catalyst of sample 14 is about 390 nm, the particle diameter of titanium-oxide nanoparticles as the primary particles of sample 14 is about 21 nm, and the particle diameter of Ru nanoparticles of sample 14 is 3.2 nm. The measurements also show that Ru supported in sample 14 prepared in this example amounts to 3.15 wt %.

EXAMPLE 15

A sample in example 15 (sample 15) was produced basically in the same manner as in example 1, except that supercritical methanol prepared in the manner described below was reacted for 25 minutes. The supercritical methanol was prepared by heating and pressurizing a mixture solution to 300° C. and to 17 MPa as in example 1.

The measurements conducted using TEM images in the same manner as for sample 1 show that the particle diameter of the titanium-oxide catalyst of sample 15 is about 830 nm, the particle diameter of titanium-oxide nanoparticles as the primary particles of sample 15 is about 21 nm, and the particle diameter of Ru nanoparticles of sample 15 is 2.9 nm. The measurements also show that Ru supported in sample 15 prepared in this example amounts to 3.21 wt %.

EXAMPLE 16

A sample in example 16 (sample 16) was produced basically in the same manner as in example 1, except that supercritical methanol prepared in the manner described below was reacted for 100 minutes. The supercritical methanol was prepared by heating and pressurizing a mixture solution to 300° C. and to 17 MPa as in example 1.

The measurements conducted using TEM images in the same manner as for sample 1 show that the particle diameter of the titanium-oxide catalyst of sample 16 is about 1320 nm, the particle diameter of titanium-oxide nanoparticles as the primary particles of sample 16 is about 18 nm, and the particle diameter of Ru nanoparticles of sample 16 is 2.7 nm. The measurements also show that Ru supported in sample 16 prepared in this example amounts to 2.64 wt %.

EXAMPLE 17

A sample in example 17 (sample 17) was produced basically in the same manner as in example 1, except that supercritical methanol prepared in the manner described below was reacted for 360 minutes. The supercritical methanol was prepared by heating and pressurizing a mixture solution to 300° C. and to 17 MPa as in example 1.

The measurements conducted using TEM images in the same manner as for sample 1 show that the particle diameter of the titanium-oxide catalyst of sample 17 is about 1910 nm, the particle diameter of titanium-oxide nanoparticles as the primary particles of sample 17 is about 23 nm, and the particle diameter of Ru nanoparticles of sample 17 is 3.1 nm. The measurements also show that Ru supported in sample 17 prepared in this example amounts to 2.52 wt %.

EXAMPLE 18

A sample in example 18 (sample 18) was produced basically in the same manner as in example 1, except that a solution prepared in the manner described below was reacted for one hour. The solution was prepared by adding an excess amount of triethanolamine as a reducing agent, which amounts to three or more equivalents, to the precursor solution, which was then reacted at room temperature as in example 1.

The measurements conducted using TEM images in the same manner as for sample 1 show that the particle diameter of the titanium-oxide catalyst of sample 18 is about 600 nm, the particle diameter of titanium-oxide nanoparticles as the primary particles of sample 18 is about 22 nm, and the particle diameter of Ru nanoparticles of sample 18 is 3.3 nm. The measurements also show that Ru supported in sample 18 prepared in this example amounts to 0.72 wt %.

EXAMPLE 19

A sample in example 19 (sample 19) was produced basically in the same manner as in example 1, except that a solution prepared in the manner described below was reacted for six hours. The solution was prepared by adding an excess amount of triethanolamine as a reducing agent, which amounts to three or more equivalents, to the precursor solution, which was then reacted at room temperature as in example 1.

The measurements conducted using TEM images in the same manner as for sample 1 show that the particle diameter of the titanium-oxide catalyst of sample 19 is about 610 nm, the particle diameter of titanium-oxide nanoparticles as the primary particles of sample 19 is about 21 nm, and the particle diameter of Ru nanoparticles of sample 19 is 3.2 nm.

The measurements also show that Ru supported in sample 19 prepared in this example amounts to 5.29 wt %.

EXAMPLE 20

A sample in example 20 (sample 20) was produced basically in the same manner as in example 1, except that a solution prepared in the manner described below was reacted for 10 hours. The solution was prepared by adding an excess amount of triethanolamine as a reducing agent, which amounts to three or more equivalents, to the precursor solution, which was then reacted at room temperature as in example 1.

The measurements conducted using TEM images in the same manner as for sample 1 show that the particle diameter of the titanium-oxide catalyst of sample 20 is about 590 nm, the particle diameter of titanium-oxide nanoparticles as the primary particles of sample 20 is about 20 nm, and the particle diameter of Ru nanoparticles of sample 20 is 2.7 nm. The measurements also show that Ru supported in sample 20 prepared in this example amounts to 9.31 wt %.

EXAMPLE 21

A sample in example 21 (sample 21) was produced basically in the same manner as in example 1, except that a solution prepared in the manner described below was reacted for 24 hours. The solution was prepared by adding an excess amount of triethanolamine as a reducing agent, which amounts to three or more equivalents, to the precursor solution, which was then reacted at room temperature as in example 1.

The measurements conducted using TEM images in the same manner as for sample 1 show that the particle diameter of the titanium-oxide catalyst of sample 21 is about 640 nm, the particle diameter of titanium-oxide nanoparticles as the primary particles of sample 21 is about 19 nm, and the particle diameter of Ru nanoparticles of sample 21 is 3.4 nm. The measurements also show that Ru supported in sample 21 prepared in this example amounts to 21.59 wt %.

EXAMPLE 22

A sample in example 22 (sample 22) was produced basically in the same manner as in example 1, except that a solution prepared in the manner described below was reacted for 48 hours. The solution was prepared by adding an excess amount of triethanolamine as a reducing agent, which amounts to three or more equivalents, to the precursor solution, which was then reacted at room temperature as in example 1.

The measurements conducted using TEM images in the same manner as for sample 1 show that the particle diameter of the titanium-oxide catalyst of sample 22 is about 620 nm, the particle diameter of titanium-oxide nanoparticles as the primary particles of sample 22 is about 24 nm, and the particle diameter of Ru nanoparticles of sample 22 is 3.5 nm. The measurements also show that Ru supported in sample 22 prepared in this example amounts to 38.46 wt %.

Samples in comparative examples 1 to 3 were produced in the manner described below.

COMPARATIVE EXAMPLE 1

A sample in comparative example 1 (comparative sample 1) was prepared by immersing 5.0 g of titanium oxide ($TiO_2$) powder in a solution obtained by dissolving 0.023 g of $RuCl_3 \cdot 3H_2O$ completely in 10 mL of pure water, stirring the solution thoroughly, and then allowing it to stand for five minutes, and then drying the solution at 80° C. for about 16 hours. The measurements using ICP-AES show that Ru supported in comparative sample 1 prepared in this example amounts to 3.12 wt %.

The measurements using low-resolution TEM images (not shown) show that the particle diameter of comparative sample 1 is about 560 nm. The measurements using high-resolution TEM images (refer to FIG. 3A) show that the particle diameter of Ru as the catalytic metal of comparative sample 1 is 2.6 nm.

COMPARATIVE EXAMPLE 2

A sample in comparative example 2 was prepared basically in the same manner as in comparative example 1, except that 0.015 g of $RuCl_3 \cdot 3H_2O$ was completely dissolved in about 10 mL of pure water. The measurements using ICP-AES show that Ru supported in comparative sample 2 prepared in this example amounts to 2.45 wt %.

The measurements using low-resolution TEM images show that the particle diameter of comparative sample 2 is about 570 nm. The measurements using high-resolution TEM images show that the particle diameter of Ru as the catalytic metal of comparative example 2 is 1.9 nm.

COMPARATIVE EXAMPLE 3

A sample in comparative example 3 was prepared basically in the same manner as in comparative example 1, except that 0.072 g of $RuCl_3 \cdot 3H_2O$ was completely dissolved in about 10 mL of pure water. The measurements using ICP-AES show that Ru supported in comparative sample 2 prepared in this example amounts to 2.89 wt %.

The measurements using low-resolution TEM images show that the particle diameter of comparative sample 3 is about 550 nm. The measurements using high-resolution TEM images show that the particle diameter of Ru as the catalytic metal of comparative example 3 is 9.8 nm.

The state of the catalytic metal Ru supported on the surface of the titanium-oxide nanoparticle assembly in each of sample 1 and comparative sample 1 under normal temperature conditions and under high temperature conditions will now be described with reference to FIGS. 2 to 5.

First, sample 1 was heated in a vacuum or in the air to 300° C. or 400° C. at a temperature rise rate of 2° C./min. and was fired at this temperature for four hours. The fired sample was then reduced in a flow of $H_2$ at 300° C. for two hours.

In the same manner, comparative sample 1 was heated in a vacuum or in the air to 350° C. at a temperature rise rate of 2° C./min, and was fired at this temperature for four hours. The sample was then reduced in a flow of $H_2$ at 300° C. for two hours.

The samples prepared as described above, namely, the titanium-oxide catalyst of sample 1 and the titanium-oxide catalyst of comparative example 1 after calcination, and sample 1 and comparative sample 1 before calcination, were imaged with a transmission electron microscope to obtain TEM images (refer to FIGS. 2 and 3A to 3F). Also, EDX mapping photographs of sample 1 before calcination and sample 1 after calcination were taken (refer to FIG. 4A to 4C).

The low-resolution TEM images of sample 1 in FIGS. 2, 3C, and 3E reveal that the particle diameter of titanium-oxide catalyst produced in example 1 is about 610 nm both before and after calcination. The images also show that the assembly is formed by a plurality of titanium-oxide nanoparticles (primary particles). Further, the particle diameter of titanium-oxide nanoparticles, which are the primary particles, is about 28 nm (refer to FIG. 2).

The high-resolution TEM images reveal that comparative sample 1 before calcination contains the catalytic metal Ru supported on the surface of the titanium-oxide nanoparticle assembly in the form of nanoparticles (refer to FIG. 3A), whereas comparative sample 1 after calcination at 350° C. for four hours in a vacuum contains the supported catalytic metal Ru sintered on the surface of the titanium-oxide nanoparticle assembly (refer to FIG. 3B).

In contrast, sample 1 contains the nanoparticles of the catalytic metal Ru supported on the surface of the titanium-oxide nanoparticle assembly in the form of nanoparticles both before and after calcination (refer to FIG. 3D).

The distribution of the catalytic metal Ru of sample 1 before calcination (refer to FIG. 4A) and the distribution of the catalytic metal Ru of sample 1 after calcination (refer to FIGS. 4B and 4C) were examined using the EDX mapping photographs of the catalytic metal Ru of sample 1 (refer to FIGS. 4A to 4C). The examination reveals that the catalytic metal Ru is dispersed on the surface of the titanium-oxide nanoparticle assembly in sample 1 both before and after calcination. The examination also reveals that the catalytic metal Ru supported in sample 1 remains dispersed on the surface of the titanium-oxide nanoparticle assembly without being sintered after calcination.

Further experiments conducted using X-ray diffraction of sample 1 before and after calcination show no difference in the X-ray diffraction patterns between sample 1 before calcination and sample 1 after calcination at 300° C. or 400° C. in the air or in a vacuum, and also show no noticeable peaks observed for the catalytic metal Ru and the ruthenium oxide. This reveals that the catalytic metal Ru supported in sample 1 in examples of the present invention undergoes no sintering after calcination (refer to FIG. 5).

The titanium-oxide catalysts produced in examples 1 to 22 will now be evaluated for their conversion.

First, equal amounts (10 mg) of samples 1 to 22 and comparative samples 1 to 3 were placed into separate glass tubes. Predetermined amounts of carbon dioxide ($CO_2$) and hydrogen ($H_2$) were placed into vessels filled with argon gas (Ar) with the ratio of $CO_2$, $H_2$, and Ar of 1:4:9. The glass tubes separately containing these samples were set in the vessels.

The vessels set in this manner were allowed to stand for one hour at 400° C. The change in the amount of carbon dioxide in each vessel was examined, and rated as A, B, or C based on the criteria described below.

A (very good): The amount of carbon dioxide decreased greatly in comparison with comparative example 1.

B (good): The amount of carbon dioxide decreased sufficiently in comparison with comparative example 1.

C (poor): The amount of carbon dioxide changed by an amount not different from comparative example 1.

The catalytic activity of the samples in examples 1 to 7 and comparative example 1 described above and the rating of their catalytic performance will be described below with reference to Table 1.

Table 1 shows the rating for the change in the amount of carbon dioxide achieved by the titanium-oxide catalyst of each sample varying in the particle diameter of the primary particles.

TABLE 1

| Sample No. | Diameter of Overall Particles (nm) | Diameter of Primary Particles (nm) | Diameter of Metal Particles (nm) | Supported Metal Amount (wt %) | Rating* |
|---|---|---|---|---|---|
| Sample 2 | 580 | 8 | 2.9 | 3.18 | B |
| Sample 3 | 600 | 12 | 3.0 | 3.21 | B |
| Sample 1 | 610 | 19 | 3.2 | 3.02 | A |
| Sample 4 | 610 | 28 | 2.8 | 3.07 | A |
| Sample 5 | 620 | 43 | 3.1 | 2.95 | A |
| Sample 6 | 640 | 54 | 3.3 | 3.31 | B |
| Sample 7 | 630 | 71 | 2.8 | 2.87 | B |
| Comparative Sample 1 | 560 | N/A | 2.6 | 3.12 | N/A |

*A: very good, B: good

As shown in Table 1, the titanium-oxide catalysts produced in examples 1 to 7 have decreased the amount of carbon dioxide by a sufficiently large amount in comparison with comparative sample 1 produced in comparative example 1. The titanium-oxide catalysts produced in examples 1 to 7 thus have effective catalytic activity. Among them, the titanium-oxide catalysts produced in examples 2, 3, 6, and 7 have lower catalytic activity than those in examples 1, 4, and 5.

Based on the results for examples 1, 4, and 5 showing more effective catalytic activity, the primary particles of a titanium-oxide catalyst may have a particle diameter of 10 nm or more and less than 50 nm in some embodiments, and may have a particle diameter of 20 to 40 nm inclusive in some other embodiments.

Based on the results described above, the titanium-oxide catalysts produced in examples 1 to 7 each contain the catalytic metal Ru dispersed and supported on the surface of the titanium-oxide nanoparticle assembly after thermal treatment. These titanium-oxide catalysts have higher catalytic activity than the titanium-oxide catalyst produced in comparative example 1. This reveals that the titanium-oxide catalysts produced in examples 1 to 7 are usable under high temperature conditions.

The samples in examples 1 to 7 have higher conversion than the sample in comparative example 1. This seems to be because the titanium-oxide nanoparticle assembly in example 1 has a larger surface area for supporting the catalytic metal Ru than the titanium oxide in comparative example 1 having no assembly structure.

In detail, for example, titanium oxide with a particle diameter of 600 nm has a surface area per unit mass (specific surface area) of 2.56 $m^2/g$, whereas titanium oxide with a particle diameter of 6 nm has a specific surface area of 256.41 $m^2/g$. Thus, a titanium-oxide nanoparticle assembly, which is an assembly of titanium-oxide nanoparticles having large specific surface areas, has a larger specific surface area than a solid titanium-oxide particle with the same size, and can support a larger amount of catalytic metal Ru.

The titanium-oxide nanoparticle assembly, which is an assembly of primary particles, has surface irregularities (projections and depressions), and thus has a larger surface area than a solid titanium-oxide particle with the same size, and can support many particles of the catalytic metal.

The samples in examples 1 to 7 have higher conversion under high temperature conditions than the sample in comparative example 1, because the nanoparticles of the catalytic metal Ru are not sintered.

In detail, the titanium-oxide nanoparticle assembly is an assembly of titanium-oxide nanoparticles as the primary particles. The titanium-oxide nanoparticle assembly thus has surface irregularities (projections and depressions). Thus, when particles of the catalytic metal Ru are moved by heat generated from a catalytic reaction or by heat from intentional heating, the particles of the catalytic metal Ru are placed into the depressions 102 on the surface of the titanium-oxide nanoparticle assembly and are supported in the depressions 102. The catalytic metal is thus dispersed in the form of nanoparticles and is supported in a stable manner under high temperature conditions.

The titanium-oxide catalyst can thus show desired catalysis under high temperature conditions.

The above findings reveal that the primary particles may have a particle diameter of 10 to 50 nm inclusive in some embodiments, and may have a particle diameter of 20 to 40 nm inclusive in some other embodiments.

Table 2 shows the rating for the decrease in the amount of carbon dioxide for samples 1 and 8 to 11 in comparison with comparative samples 1 to 3 each with the catalytic metal Ru varying in the particle diameter supported on the surface of the titanium-oxide nanoparticle assembly.

TABLE 2

| Sample No. | Diameter of Overall Particles (nm) | Diameter of Primary Particles (nm) | Diameter of Metal Particles (nm) | Supported Metal Amount (wt %) | Rating* |
|---|---|---|---|---|---|
| Sample 8 | 590 | 22 | 1.3 | 2.67 | B |
| Sample 1 | 610 | 19 | 3.2 | 3.02 | A |
| Sample 9 | 620 | 24 | 4.0 | 2.53 | A |
| Sample 10 | 580 | 28 | 5.3 | 2.65 | B |
| Sample 11 | 580 | 24 | 9.6 | 2.83 | B |
| Comparative Sample 1 | 560 | N/A | 2.6 | 3.12 | N/A |
| Comparative Sample 2 | 570 | N/A | 1.9 | 2.45 | C |
| Comparative Sample 3 | 550 | N/A | 9.8 | 2.89 | C |

*A: very good, B: good, C: poor

As shown in Table 2, the sample in comparative example 2 with a large particle diameter of nanoparticles of catalytic metal Ru, and the sample in comparative example 3 with a small particle diameter of nanoparticles of catalytic metal Ru have shown no higher catalytic activity than the sample in comparative example 1.

In contrast, the titanium-oxide catalysts with a particle diameter of about 1.0 to 10.0 nm of catalytic metal Ru have shown sufficiently high catalytic activity (examples 1 and 8 to 10).

Based on the results described above, the titanium-oxide catalysts produced in examples 1 and 8 to 11 have more effective catalytic activity. This reveals that the catalytic metal particles of a titanium-oxide catalyst may have a particle diameter of 1 nm or more and less than 10 nm in some embodiments.

The titanium-oxide catalysts obtained in examples 1 and 9 can decrease the amount of carbon dioxide by an amount larger than the other titanium-oxide catalysts. As a result, the diameter of catalytic metal particles of a titanium-oxide catalyst may be 3 to 4 nm inclusive in some embodiments.

The results for examples 1 and 8 to 11 further reveal that the titanium-oxide catalysts with primary particles having a particle diameter at least twice the particle diameter of the particles of the catalytic metal Ru have shown effective catalytic activity. Based on this finding, together with the results for examples 1 to 7, the primary particles having a particle diameter of 2 nm can have effective catalytic activity when the particle diameter of the catalytic metal Ru is 1.0 nm. Thus, the primary particles of a titanium-oxide catalyst may have a particle diameter of 2 to 50 nm inclusive in some embodiments.

In the same manner, Table 3 shows the rating for the change in the amount of carbon dioxide for samples 1 and 12 to 17 each with the titanium-oxide nanoparticle assembly varying in its particle diameter (the diameter of its overall particles).

TABLE 3

| Sample No. | Diameter of Overall Particles (nm) | Diameter of Primary Particles (nm) | Diameter of Metal Particles (nm) | Supported Metal Amount (wt %) | Rating* |
|---|---|---|---|---|---|
| Sample 12 | 110 | 23 | 2.5 | 3.12 | B |
| Sample 13 | 200 | 25 | 3.4 | 2.98 | B |
| Sample 14 | 390 | 21 | 3.2 | 3.15 | B |
| Sample 1 | 610 | 19 | 3.2 | 3.02 | A |
| Sample 15 | 830 | 21 | 2.9 | 3.21 | A |
| Sample 16 | 1320 | 18 | 2.7 | 2.64 | B |
| Sample 17 | 1910 | 23 | 3.1 | 2.52 | B |
| Comparative Sample 1 | 560 | N/A | 2.6 | 3.12 | N/A |

*A: very aood, B: good

As shown in Table 3, the titanium-oxide catalysts obtained in examples 1 and 12 to 17 have decreased the amount of carbon dioxide by an amount larger than the amount achieved by the titanium-oxide catalyst obtained in comparative example 1. The titanium-oxide catalysts obtained in examples 1 and 15 have decreased the amount of carbon dioxide more markedly than the titanium-oxide catalyst in comparative example 1.

A titanium-oxide catalyst with an overall particle diameter of 100 nm or less, like the titanium-oxide catalyst obtained in example 12, can fill a glass tube with a high filling factor. In this case, more particles of titanium-oxide catalyst can have unexposed surfaces. As a result, particles of the catalytic metal Ru supported on the surface of the titanium-oxide nanoparticle assembly may be covered, and thus cannot have markedly high catalytic activity.

A titanium-oxide catalyst with an overall particle diameter of more than 1000 nm, like the titanium-oxide catalysts obtained in examples 16 and 17, can have sufficiently high activity as a catalyst for reductive reactions of carbon dioxide. However, no great improvement is observed in the catalytic activity of the titanium-oxide catalyst produced using the titanium-oxide nanoparticle assembly with a particle diameter larger than 2000 nm, when the conversion of this titanium-oxide catalyst is compared with the conversion of the titanium-oxide catalyst produced using the titanium-oxide nanoparticle assembly with a particle diameter of 2000 nm or less. In addition, preparing the titanium-oxide nanoparticle assembly with a particle diameter larger than 2000 nm takes a long time.

Despite its high cost and long time to prepare the titanium-oxide nanoparticle assembly of the titanium-oxide catalyst with a particle diameter larger than 2000 nm, the conversion of the resultant titanium-oxide catalyst is not high enough, considering the longer time taken to prepare the titanium-oxide nanoparticle assembly.

This reveals that a titanium-oxide catalyst may have an overall particle diameter of 100 to 2000 nm inclusive in some embodiments, and may have an overall particle diameter of 600 to 800 nm in some other embodiments.

In the same manner, Table 4 shows the rating for the decrease in the amount of carbon dioxide in correspondence with the amount of metal catalyst Ru (wt %) supported on the titanium-oxide catalyst for samples 1 and 18 to 22.

TABLE 4

| Sample No. | Diameter of Overall Particles (nm) | Diameter of Primary Particles (nm) | Diameter of Metal Particles (nm) | Supported Metal Amount (wt %) | Rating* |
|---|---|---|---|---|---|
| Sample 18 | 600 | 22 | 3.3 | 0.72 | B |
| Sample 1 | 610 | 19 | 3.2 | 3.02 | A |
| Sample 19 | 610 | 21 | 3.2 | 5.29 | A |
| Sample 20 | 590 | 20 | 2.7 | 9.31 | B |
| Sample 21 | 640 | 19 | 3.4 | 21.59 | B |
| Sample 22 | 620 | 24 | 3.5 | 38.46 | B |
| Comparative Sample 1 | 560 | N/A | 2.6 | 3.12 | N/A |

*A: very good, B: good

As shown in Table 4, samples 18 to 22 have shown higher catalysis than the sample in comparative sample 1. Samples 1 and 19, with the amount of supported catalytic metal Ru of 3.0 to 6.0 wt % inclusive, have decreased the amount of carbon dioxide sufficiently. Although sample 18 having a smaller amount of supported catalytic metal Ru has shown higher catalysis than the sample in comparative sample 1, sample 18 has decreased the amount of carbon dioxide by a smaller amount than the samples in the other examples.

Based on the above finding, the content of the catalytic metal Ru may be set to 1 to 40 wt % inclusive of the total of 100 wt % of the titanium-oxide nanoparticle assembly and the catalytic metal. The resultant titanium-oxide catalyst can have intended functions as a catalyst for reductive reactions of carbon dioxide and can also show efficient catalysis.

Additionally, the titanium-oxide catalyst with the content of the catalytic metal of 3.0 to 6.0 wt % inclusive will have more efficient catalysis.

Although $Ti[OCH(CH_3)_2]_4$ is used as a titanium compound in each of the examples described above, the titanium compound may not be this inorganic compound but may be another titanium compound, such as $TiF_4$. Although titanium-oxide nanoparticles synthesized from another titanium compound such as $TiF_4$ can be spherical and porous, processing such titanium-oxide nanoparticles into finer primary particles is difficult, and thus $Ti(O^iPr)_4$ may be used instead.

Although Ru is used as the catalytic metal in each of the examples described above, the catalytic metal may not be Ru but may be a metal such as Pt, Ni, Pd, Cu, Rh, or Re to provide a catalyst for reductive reactions of carbon dioxide. Further, another metal may be used to provide a catalyst containing metal for reduction of a compound other than carbon dioxide.

While the invention has been described with respect to a limited number of embodiments, those skilled in the art, having benefit of this disclosure, will appreciate that other embodiments can be devised which do not depart from the scope of the invention as disclosed herein.

REFERENCE SIGNS LIST 1 titanium-oxide catalyst
10 titanium-oxide nanoparticle assembly
11 titanium-oxide nanoparticle
20 ruthenium particle
101 projection
102 depression

The invention claimed is:

1. A titanium oxide catalyst, comprising:
a titanium oxide nanoparticle assembly that includes titanium oxide nanoparticles as primary particles; and
catalytic metal particles dispersed and supported on a surface of the titanium oxide nanoparticle assembly,
wherein each of the catalytic metal particles has a particle diameter smaller than a particle diameter of each of the primary particles; and
wherein an average distance between the catalytic metal particles is larger than an average distance between the primary particles.

2. The titanium oxide catalyst according to claim 1, wherein
the catalytic metal is supported in depressions formed by adjacent primary particles of the titanium oxide nanoparticle assembly.

3. The titanium-oxide catalyst according to claim 2, wherein
the content of the catalytic metal is 1 to 40 wt % inclusive of a total of 100 wt % of the titaniumoxide nanoparticle assembly and the catalytic metal.

4. The titanium oxide catalyst according to claim 2, wherein
the primary particles have a particle diameter of 2 to 50 nm inclusive.

5. The titanium oxide catalyst according to claim 2, wherein
the catalytic metal has a particle diameter of 1 to 10 nm inclusive, and
the primary particles have a particle diameter at least twice the particle diameter of the catalytic metal.

6. The titanium oxide catalyst according to claim 1, wherein
the content of the catalytic metal is 1 to 40 wt % inclusive of a total of 100 wt % of the titanium oxide nanoparticle assembly and the catalytic metal.

7. The titanium oxide catalyst according to claim 6, wherein
the primary particles have a particle diameter of 2 to 50 nm inclusive.

8. The titanium oxide catalyst according to claim 6, wherein
the catalytic metal has a particle diameter of 1 to 10 nm inclusive, and
the primary particles have a particle diameter at least twice the particle diameter of the catalytic metal.

9. The titanium oxide catalyst according to claim 1, wherein
the primary particles have a particle diameter of 2 to 50 nm inclusive.

10. The titanium oxide catalyst according to claim 9, wherein
the catalytic metal has a particle diameter of 1 to 10 nm inclusive, and
the primary particles have a particle diameter at least twice the particle diameter of the catalytic metal.

11. The titanium oxide catalyst according to claim 1, wherein
the catalytic metal has a particle diameter of 1 to 10 nm inclusive, and the primary particles have a particle diameter at least twice the particle diameter of the catalytic metal.

12. The titanium oxide catalyst according to claim 1, wherein the titanium oxide nanoparticle assembly has a particle diameter of 100 to 2000 nm inclusive.

13. The titanium oxide catalyst according to claim 1, wherein
the catalytic metal is at least one metal selected from the group consisting of Ru, Pt, Pd, Au, Ag, Cu, Ni, Fe, Ir, Rh, and Re.

14. A titanium oxide catalyst according to claim 1, wherein each of the catalytic metal particles is formed by a metal or a metal containing material that is different from titanium oxide.

15. The titanium oxide catalyst according to claim 1, wherein the titanium oxide nanoparticle assembly is produced by reacting carboxylic acid with titanium compounds in supercritical fluid.

16. The titaniiimoxide catalyst according to claim 1, wherein the titanium oxide catalyst is produced by adding a reducing agent to a solution containing the titanium oxide nanoparticle assembly and the catalytic metal sources so as to causing a reductive reaction, prior to a thermal treatment.

17. The titanium oxide catalyst according to claim 1, wherein the titanium oxide nanoparticle assembly is produced by reacting carboxylic acid with titanium compounds in supercritical fluid; and
wherein the titanium oxide catalyst is produced by adding a reducing agent to a solution containing the titanium oxide nanoparticle assembly and the catalytic metal sources so as to causing a reductive reaction, prior to a thermal treatment.

18. A method of producing a titanium oxide catalyst, the method comprising:
causing catalytic metal particles to be supported on a titanium oxide nanoparticle assembly, the titanium oxide nanoparticle assembly that includes titanium oxide nanoparticles as primary particles,
wherein an average distance between the catalytic metal particles is larger than an average distance between the primary particles.

19. The method of producing a titanium oxide catalyst according to claim 18, further comprising:
thermally treating the titanium oxide nanoparticle assembly on which the catalytic metal has been supported.

20. The method of producing a titanium oxide catalyst according to claim 19, wherein
the thermally treating includes thermally treating the titanium oxide nanoparticle assembly at a temperature of 300 to 400 ° C. inclusive for a time period of 5 to 15 minutes inclusive.

21. A method of producing a titanium oxide catalyst according to claim 18,
wherein each of the catalytic metal particles is formed by a metal or a metal containing material that is different from titanium oxide.

22. A method for performing hydrogen reduction of carbon dioxide, comprising
reducing the carbon dioxide using a titanium oxide catalyst,
wherein the catalyst comprises:
a titanium oxide nanoparticle assembly that includes titanium oxide nanoparticles as primary particles; and
catalytic metal particles dispersed and supported on a surface of the titanium oxide nanoparticle assembly, wherein each of the catalytic metal particles has a particle diameter smaller than a particle diameter of each of the titanium oxide nanoparticle assembly and the primary particles,
wherein an average distance between the catalytic metal particles is larger than an average distance between the primary particles.

23. A method for performing hydrogen reduction of carbon dioxide according to claim 22,
wherein each of the catalytic metal particles is formed by a metal or a metal containing material that is different from titanium oxide.

\* \* \* \* \*